United States Patent [19]

Sato

[11] Patent Number: 5,222,417
[45] Date of Patent: Jun. 29, 1993

[54] HYDRAULIC CONTROL SYSTEM OF AN AUTOMATIC TRANSMISSION FOR A MOTOR VEHICLE

[75] Inventor: Keiji Sato, Musashino, Japan

[73] Assignee: Fuji Jukogyo Kabushiki Kaisha, Tokyo, Japan

[21] Appl. No.: 812,438

[22] Filed: Dec. 20, 1991

[30] Foreign Application Priority Data

Jan. 22, 1991 [JP] Japan .................................. 3-20284

[51] Int. Cl.[5] ..................... B60K 41/12; F16H 61/00
[52] U.S. Cl. ............................... 74/861; 74/867; 74/869; 60/488; 91/429; 137/330; 474/18; 474/22
[58] Field of Search ..................... 60/433, 488; 74/861, 74/867, 869; 91/429; 137/330, 487.5, 625.65; 474/18, 22, 28, 69, 70

[56] References Cited

U.S. PATENT DOCUMENTS

| | | | |
|---|---|---|---|
| 3,094,132 | 6/1963 | Byloff | 137/330 X |
| 3,709,253 | 1/1973 | Spangenberg | 91/429 X |
| 4,481,768 | 11/1984 | Goshorn et al. | 91/429 X |
| 4,524,645 | 6/1985 | Tatsumi | 74/861 X |
| 4,534,243 | 8/1985 | Yokoyama et al. | 474/28 X |
| 4,663,991 | 5/1987 | Nakamura et al. | 474/28 X |
| 4,702,725 | 10/1987 | Kouno et al. | 474/28 |
| 4,743,223 | 5/1988 | Tokoro et al. | 474/69 |
| 4,747,808 | 5/1988 | Moan | 474/18 X |
| 4,752,277 | 6/1988 | Morimoto | 474/28 X |
| 4,781,655 | 11/1988 | Tezuka | 474/28 |
| 4,813,443 | 3/1989 | Pounder | 137/487.5 X |
| 4,838,037 | 6/1989 | Wood | 91/429 X |
| 4,960,365 | 10/1990 | Horiuchi | 137/625.65 X |
| 4,967,557 | 11/1990 | Izumi et al. | 60/433 X |
| 5,069,037 | 12/1991 | Sakigawa et al. | 60/488 X |
| 5,083,982 | 1/1992 | Sato | 474/28 |

FOREIGN PATENT DOCUMENTS

| | | | |
|---|---|---|---|
| 0023416 | 2/1981 | European Pat. Off. | 137/487.5 |
| 1-153854 | 6/1979 | Japan | 474/70 |
| 1-135956 | 5/1989 | Japan | 474/70 |
| 1-153851 | 6/1989 | Japan | 474/69 |

*Primary Examiner*—Rodney H. Bonck
*Assistant Examiner*—David E. Henn
*Attorney, Agent, or Firm*—Martin A. Farber

[57] ABSTRACT

A solenoid operated control valve in an automatic transmission is operated by dither current. A flow rate of oil through the solenoid operated control valve is calculated. At least either one of the frequency and amplitude of the dither current is corrected by the flow rate. The solenoid operated control valve is operated by the dither current.

10 Claims, 8 Drawing Sheets

HYDRAULIC CONTROL SYSTEM OF AN AUTOMATIC TRANSMISSION FOR A MOTOR VEHICLE

BACKGROUND OF THE INVENTION

The present invention relates to a hydraulic control system for controlling a solenoid operated valve in a hydraulic circuit of an automatic transmission for a motor vehicle, and more particularly to the system for correcting a dither applied to a control current for the solenoid operated valve.

A control system for a continuously variable belt-drive automatic transmission (CVT) comprises an endless belt running over a primary pulley and a secondary pulley. Each pulley comprises a movable conical disc which is axially moved by a fluid operated servo device so as to vary a running diameter of the belt on the pulleys in dependency on driving conditions. The system is provided with a hydraulic circuit including a pump for supplying oil to the servo devices, and a pair of solenoid operated control valves for controlling secondary pressure and primary pressure in the circuit.

The system is employed with an electronic control system for controlling the valves of the hydraulic circuit. The solenoid operated control valve is a type of a proportional solenoid operated valve or reducing valve which controls hydraulic pressure in proportion to control current applied to a solenoid. Such a valve has hysteresis characteristics caused by friction between a spool and a valve body in the valve as shown by dotted lines c of FIG. 3a. In order to reduce the hysteresis of the valve, the dither which cyclically oscillates at a predetermined frequency fd with an amplitude Ad is added to a basic exciting current I to produce a dither exciting current Id as shown in FIG. 3b. The exciting current is applied to the solenoid. Thus, the hysteresis is reduced as shown by solid lines d of FIG. 3a.

However, if the viscosity of the oil changes in accordance with the temperature of the oil, the magnitude of the hysteresis also changes.

Japanese Patent Application Laid-open 1-199079 discloses a control system of a proportional solenoid operated reducing valve, where the frequency of the dither current is changed in a high temperature range and a low temperature range to reduce the change of the hysteresis.

However, in the valve, if the rotating speed of the oil pump is increased, the flow rate of the oil passing through the valve increases. A large pressure of the oil is applied to the spool of the valve in a radial direction of the spool to urge the spool to an inside wall of the valve body. As a result, the variation value of the control pressure corresponding to the displacement of the spool and the control gain become small. Accordingly, the effect of the dither current is not sufficiently obtained. Since the hysteresis increases, a preferable static characteristic between the solenoid current and the secondary pressure can not be obtained, causing malfunctioning and slipping of the belt of the transmission. Furthermore, the excessive pressure is fed to a hydraulic cylinder.

SUMMARY OF THE INVENTION

An object of the present invention is to provide an electronic control system for a solenoid operated valve wherein the dither current fed to a solenoid is determined in accordance with the flow rate of the oil passing through the operated valve, thereby reducing the hysteresis of the oil pressure.

According to the present invention, there is provided a hydraulic control system for a continuously variable belt-drive automatic transmission comprising a hydraulic control circuit including an oil pump and a solenoid operated control valve having a proportional solenoid for controlling a secondary pressure, calculator means for calculating a flow rate of oil passing through the control valve in dependency on discharge flow rate of the oil pump, temperature of oil, leakage of the oil from the circuit, and transmission ratio changing speed, and the dither current setting means responsive to the flow rate for setting a dither current for the solenoid by adjusting at least one of frequency and amplitude of the dither current.

In an aspect of the present invention, the hydraulic circuit includes a variable displacement pump having a plurality of outlet ports. At least one of the outlet ports is selectively communicated with an input of the pump and communicated with the outputs of the pump through a directional control valve, whereby the discharge flow rate of the pump is adjustable. The calculator derives the valve flow rate responsive to the operation of the directional control valve.

In another aspect, a hydraulic control system for an automatic transmission comprises a hydraulic circuit including an oil pump and a solenoid operated control valve having a proportional solenoid for controlling a line pressure, and a transmission operating flow calculator calculating flow rate of oil for operating the transmission. The calculator derives the valve flow rate based on the operating oil flow rate.

In the characteristics of the solenoid current and the control pressure, as the flow rate of the relief valve increases, the hysteresis increases. However, in the present invention, as the flow rate increases, the frequency of the dither current is controlled to be reduced, or the amplitude thereof is controlled to be increase. Thus, the effect of the dither current is improved, thereby reducing the hysteresis, Consequently, a sufficient control gain and a constant static characteristic are obtained.

The other objects and features of this invention will become understood from the following description with reference to the accompanying drawings.

DETAILED DESCRIPTION OF THE PREFERRED EMBODIMENTS

Figure 1A:
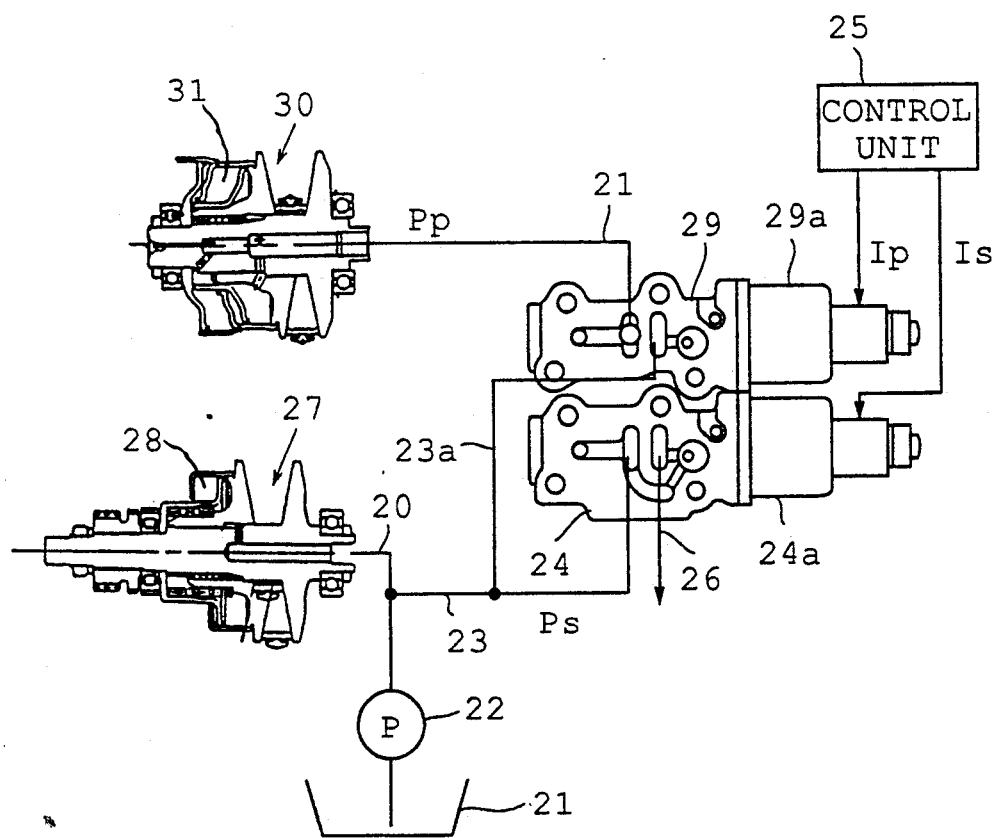
FIG. 1a shows a schematic diagram partly showing a hydraulic circuit of a continuously variable belt-drive transmission which the present invention is applied.

FIG. 1a shows a main part of a hydraulic circuit in a continuously variable transmission (CVT) for a motor vehicle, to which the present invention is applied. An oil pump 22 is provided for supplying pressurized oil to the transmission. Oil in an oil reservoir 21 is supplied to a secondary pressure control valve 24 through a passage 23 by the pump 22 for producing a predetermined secondary pressure Ps. An oil passage 20 connected to the passage 23 is communicated with a secondary cylinder 28 of a secondary pulley 27 in the transmission, so that the secondary pressure Ps is applied to the cylinder 28. The passage 23 is further communicated with a primary pressure control valve 29 through a passage 23a so that the secondary pressure Ps is applied to the primary pressure control valve 29. A primary cylinder 31 of a primary pulley 30 is applied with a primary pressure Pp controlled by the primary pressure control valve 29 through a passage 21.

The secondary pressure control valve 24 is described hereinafter.

The secondary pressure control valve 24 is adapted to be operated by a proportional solenoid operated relief valve 24a.

Figure 1B:
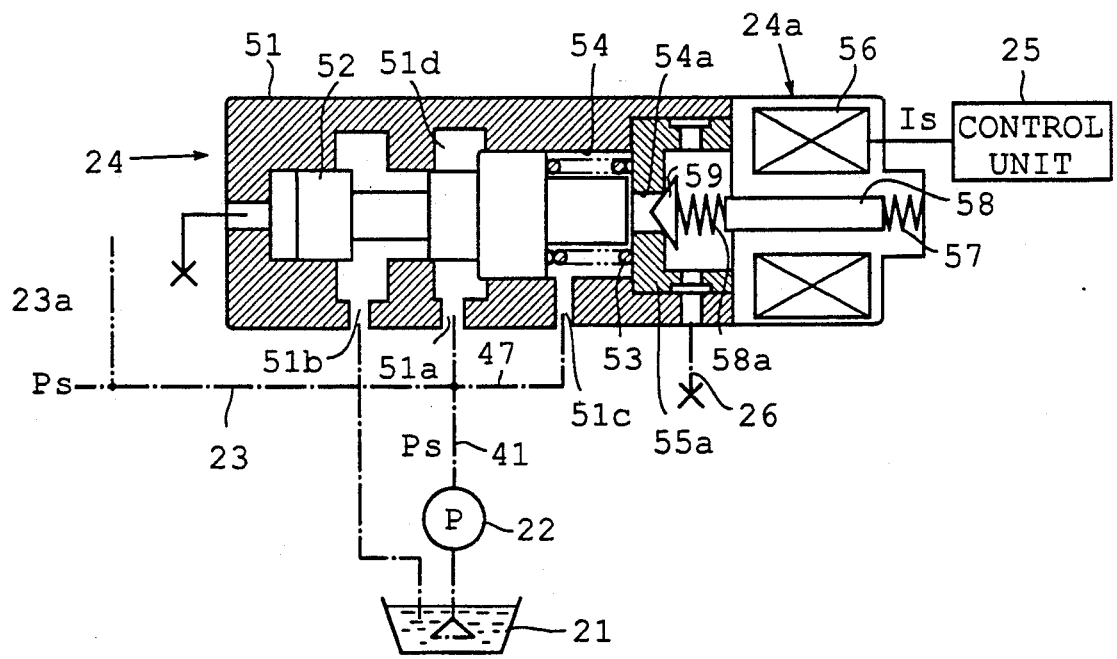
FIG. 1b is a sectional view of a secondary pressure valve.

Referring to FIG. 1b, the secondary pressure control valve 24 has a valve body 51, a spool 52, and a spring 53 for urging the spool in the downshift direction to the left in FIG. 16. The spring 53 is provided in a control chamber 54. A port 51a of the valve body 51 is communicated with the oil pump 22 through a passage 41. The port 51a is selectively communicated with a drain port 51b in accordance with the position of the spool 52. The secondary pressure Ps is applied to the lands of the spool 52 to urge the spool 52 against spring force of the spring 53. The port 51a communicates with the cylinder 28 of the secondary pulley 27 through the passage 23, and communicates with a port of the primary pressure control valve 29 through the passages 23 and 23a. The oil is drained from the drain port 51b for regulating the pressure of oil. A passage 47 connected to the passage 41 is communicated with a port 51c of the control chamber 54 so as to supply the secondary pressure Ps to the chamber 54.

The proportional solenoid operated relief valve 24a is attached to the control valve 24. The solenoid operated relief valve 24a comprises a cylinder 55a mounted in the valve body 51 adjacent the control chamber 54, a proportional solenoid 56 adjacent to the cylinder 55a, a plunger 58 slidably mounted in the solenoid 56 and held by a spring 57, and a relief valve body 59 connected to the plunger 58 through a damper spring 58a. The valve body 59 is engaged with a drain port 54a of the control chamber 54 formed in the cylinder 55a.

The relief valve 24a is adapted to be operated by current Is from the control unit 25. When the solenoid 56 is energized, the valve body 59 is retracted to open the drain port 54a.

Thus, control pressure Pc in the chamber 54 is controlled by controlling drain from the drain port 54a, which is performed by controlling the current Is.

The primary pressure control valve 29 has the same construction as the secondary pressure control valve 24 and is operated by a solenoid operated relief valve 29a.

The solenoid operated valve 29a is also operated by solenoid current Ip from the control unit 25. The current Ip produces electromagnetic force to control the primary pressure Pp in the same manner as the secondary pressure control valve 24.

A comparatively high lubricating pressure is produced in a drain passage 26 of the secondary pressure control valve 24. The lubricating pressure is applied to a torque converter, a selector device and a belt.

The control unit 25 controls the solenoid currents Is and Ip in dependency on actual and desired rotating speeds of the pulleys of the transmission, and vehicle speed and throttle valve opening degree corresponding to the driving and operating conditions of the vehicle, thereby controlling the transmission ratio of the transmission.

Figure 2:
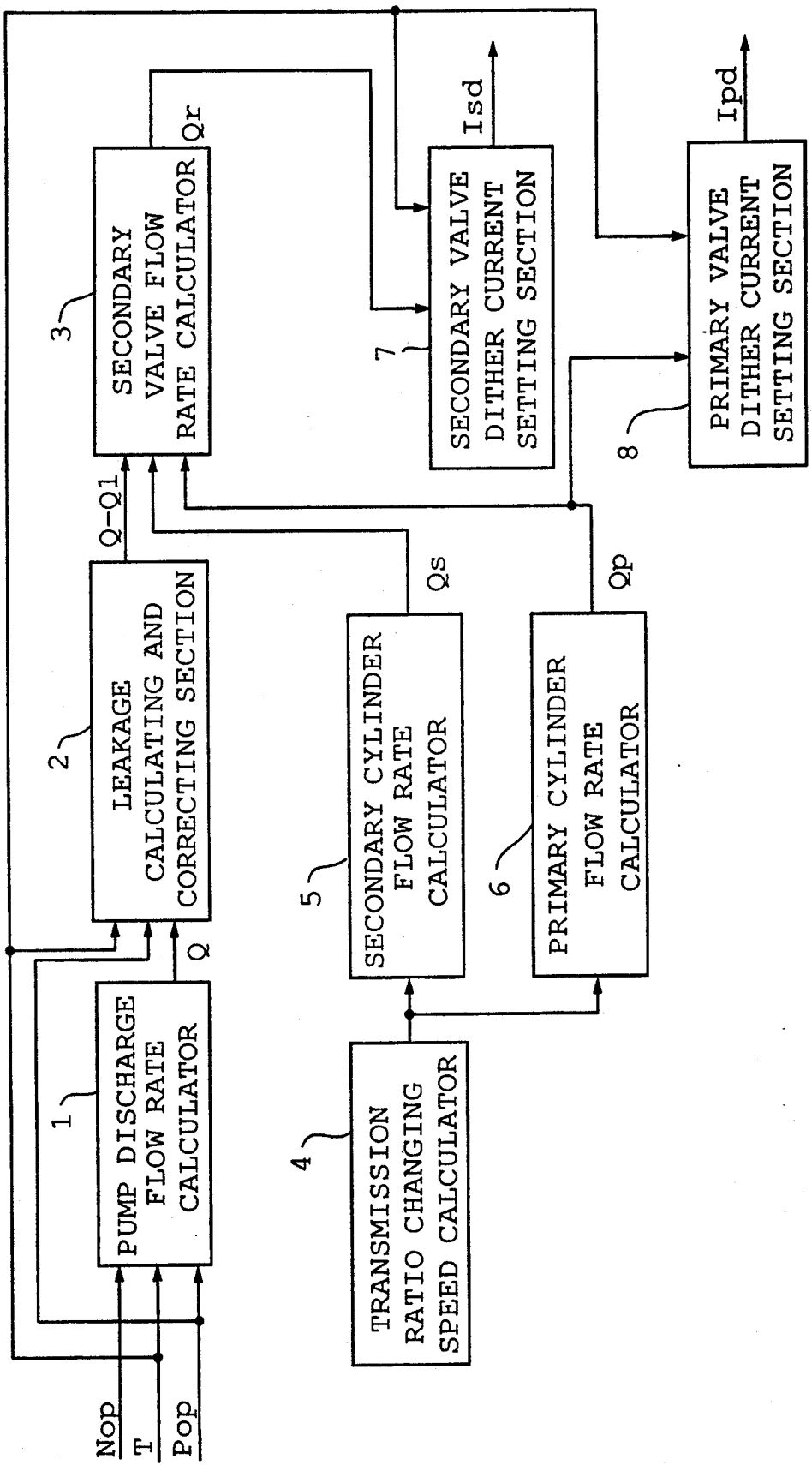
FIG. 2 shows a block diagram of a control system of the present invention.
Figure 3A:
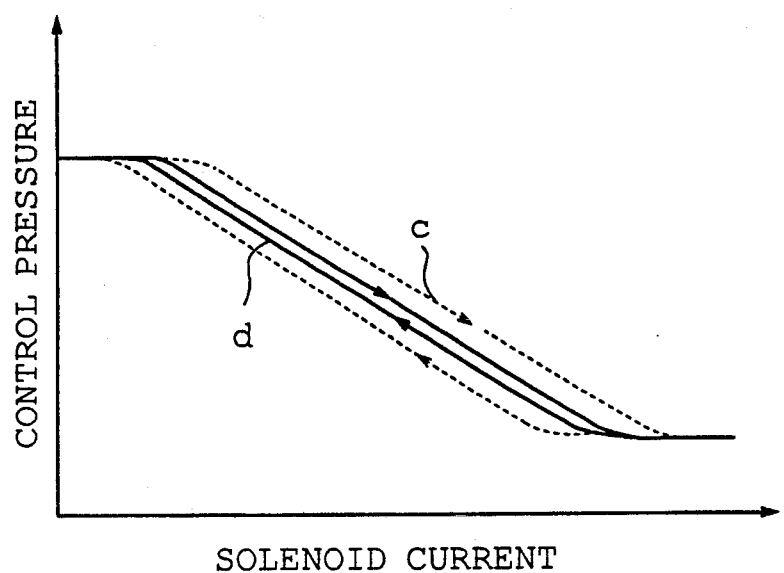
FIG. 3a is a graph showing a relationship between a solenoid current applied to a solenoid operated valve and a control pressure obtained by the solenoid operated valve.
Figure 3B:
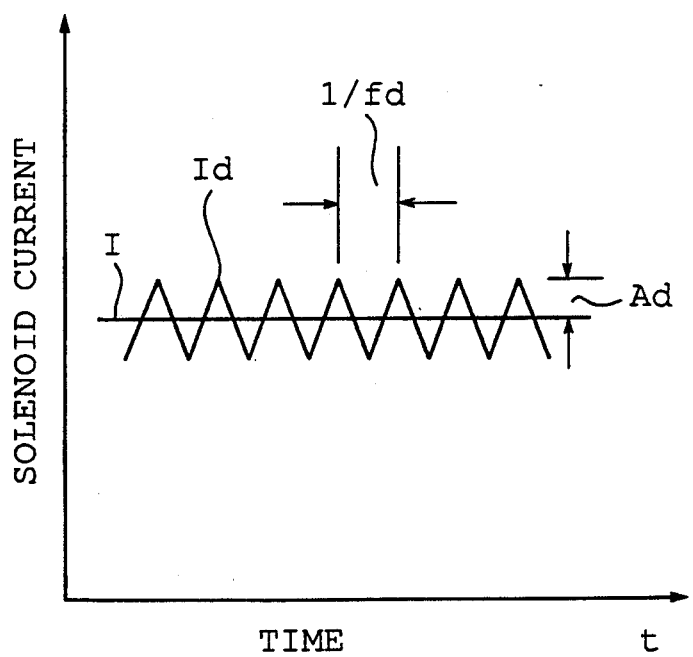
FIG. 3b is a graph showing a dither current added to the solenoid current.
Figure 4:
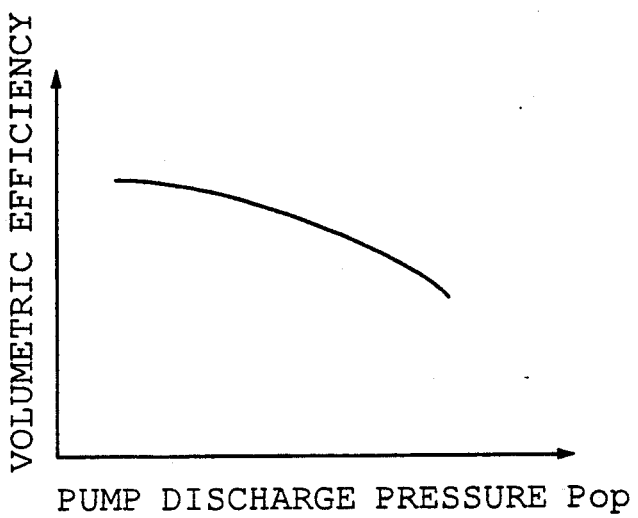
FIG. 4 is a graph showing a characteristic of discharge flow rate and volumetric efficiency of an oil pump.
Figure 5:
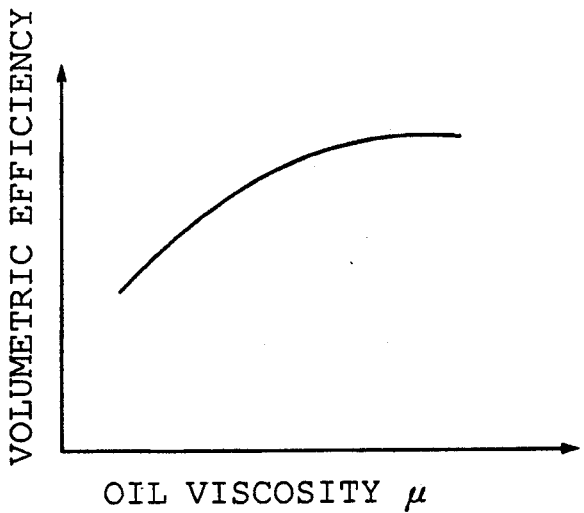
FIG. 5 is a graph showing a characteristic of oil viscosity and volumetric efficiency of the oil pump.

Referring to FIG. 2, an electronic control system of the present invention comprises a pump discharge flow rate calculator 1 applied with a pump rotating speed Nop, an oil temperature T, and a pump discharge pressure Pop for calculating a pump discharge flow rate Q. In a positive displacement pump, the discharge flow rate Q is represented by an equation $Q = \eta \cdot d \cdot Nop$ which is constructed from a volumetric efficiency $\eta$, a displacement d, and the pump rotating speed Nop. The volumetric efficiency $\eta$ is a function of the discharge pressure Pop and an oil viscosity $\mu$. As shown in FIG. 4, as the discharge pressure Pop increases, the volumetric efficiency $\eta$ reduces. As shown in FIG. 5, as the oil viscosity $\mu$ increases, the volumetric efficiency $\eta$ increases. The oil viscosity $\mu$ reduces in proportion to an increase of the oil temperature T. Accordingly, the volumetric efficiency $\eta$ is a function of the discharge pressure Pop and the oil temperature T. Thus, the discharge flow rate Q is calculated from the pump rotating speed Nop, the oil temperature T and the discharge pressure Pop.

The discharge flow rate Q is delivered to a leakage flow rate calculating and correcting section 2 to which the discharge pressure Pop and the oil temperature T are also fed. Since a leakage flow rate Q1 is proportional to the discharge pressure Pop and reduces as the oil viscosity $\mu$ increases, the leakage flow rate Q1 is calculated based on the discharge pressure Pop and the oil temperature T. The discharge flow rate Q is corrected by the leakage flow rate Q1 as Q−Q1. The corrected flow rate Q−Q1 is sent to a secondary valve flow rate calculator 3.

The system is further provided with a transmission ratio changing speed calculator 4 for calculating a desired transmission ratio changing speed or an actual transmission ratio changing speed. Vehicle driving and operating condition signals such as vehicle speed and throttle valve opening degree, desired primary pulley speed, and primary and secondary pulley speeds are delivered to the calculator 4. The desired transmission ratio changing speed (rate) is calculated based on the vehicle driving and operating condition signals, the desired primary pulley speed, and the primary and secondary pulley speeds. The actual transmission ratio changing speed (rate) is calculated based on the primary and secondary pulley speeds. The transmission ratio changing speed is applied to a secondary cylinder flow rate calculator 5 and a primary cylinder flow rate calculator 6, respectively.

Each of the flow rates of oil fed to and discharged from the secondary cylinder 28 and the primary cylinder 31 is determined in accordance with volume changing speed (rate) of the cylinder, that is represented by a transmission ratio changing speed. Consequently, the cylinder flow rate calculators 5 and 6 calculate a secondary cylinder flow rate Qs and a primary cylinder flow rate Qp based on the transmission ratio changing speed, respectively.

The flow rates Qs and Qp are fed to the secondary valve flow rate calculator 3. In the secondary valve flow rate calculator 3, a passing flow rate Qr of the valve 24 is calculated in accordance with the corrected flow rate $Q-Q1$ and the cylinder flow rates Qs and Qp. If the flow rate Qs and Qp are entering flow rates, the valve flow rate Qr is calculated by subtracting the flow rates Qs and Qp from the flow rate $Q-Q1$. If the flow rates Qs and Qp are discharging flow rates, the flow rate Qr is calculated by adding the flow rates Qs and Qp to the flow rate $Q-Q1$.

Figure 6:
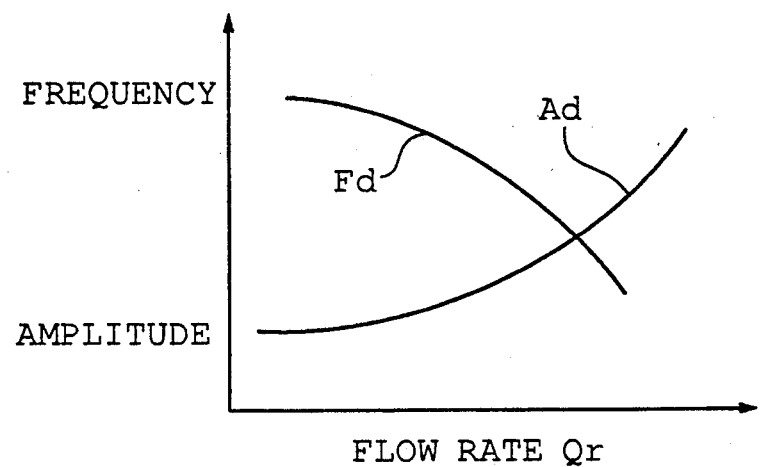
FIG. 6 is a graph showing a characteristic of the dither current corresponding to the flow rate of oil passing the valve.

The flow rate Qr is fed to a dither current setting section 7. As shown in FIG. 6, the dither current Id has a frequency Fd which is a decreasing function of the flow rate Qr and an amplitude Ad which is an increasing function of the flow rate Qr. The dither current Id is provided in accordance with a value Cs representing the flow rate Qr. The secondary dither current Isd is added to the solenoid current Is.

In the dither current Isd, both of the frequency and amplitude or either of them can be changed in accordance with the flow rate Qr. Consequently, the effect of the dither current is improved to reduce the hysteresis of the secondary valve.

The primary cylinder flow rate Qp of the primary cylinder flow rate calculator 6 is further applied to a primary valve dither current setting section 8. A dither current Ipd having the same characteristic as the dither current Isd, is provided in accordance with a value Cp representing the flow rate Qp in the same manner as the setting section 7.

If the oil temperature T is applied to the setting sections 7 and 8, each of the dither currents Isd and Ipd is corrected to increase the frequency and to decrease the amplitude in accordance with the rise of the temperature T.

In accordance with the operation of the secondary pressure control valve 24, the secondary pressure Ps is controlled. The secondary pressure is equal to the pump discharge pressure Pop. Thus, the secondary pressure Ps can be used as the discharge pressure Pop. In the electronic control system, the value Cs of the flow rate Qr, the value Cp of the flow rate Qp of the primary cylinder 31, and solenoid currents Is and Ip are updated at every 10 to 15 ms by executing calculating programs. In place of the secondary pressure Ps for calculating new values Cs and Cp, the last solenoid current is used for calculating the values. Thus, the correcting value is obtained without using a pressure sensor.

Figure 7:
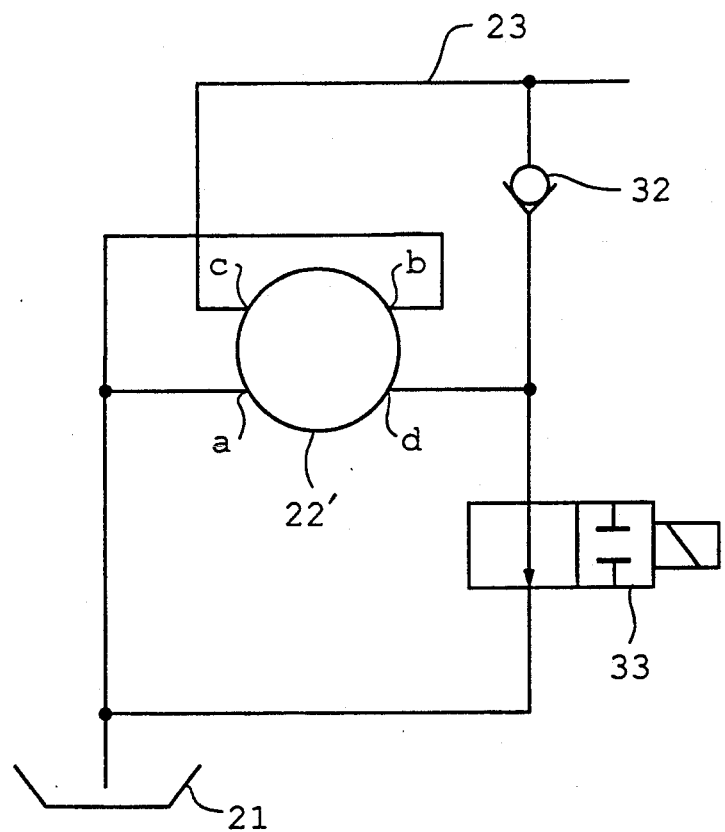
FIG. 7 is a schematic diagram showing a hydraulic circuit of another embodiment of the present invention.

Referring to FIG. 7 showing another embodiment of the present invention, an oil pump 22' has a pair of inlet ports a and b and a pair of outlet ports c and d in order to change the discharge flow rate of the pump. The inlet ports a and b are communicated with the oil reservoir 21. The outlet port c is communicated with the passage 23 and the outlet port d is communicated with the passage 23 through a check valve 32 and with the reservoir 21 through a two-port directional control valve 33. When the directional control valve 33 is closed, the oil discharged from the outlet port d is fed to the passage 23 through the check valve 32. When the valve 33 is opened, the oil from the port d is fed to the reservoir 21. Thus, the discharge flow rate of the pump 22' is changed in the ratio of 1:2 in dependency on the operation of the valve 33.

In the control system, the discharge flow rate calculator 1 is applied with an operating signal of the directional control valve 33 so as to accurately calculate the discharge flow rate Q.

Figure 8:
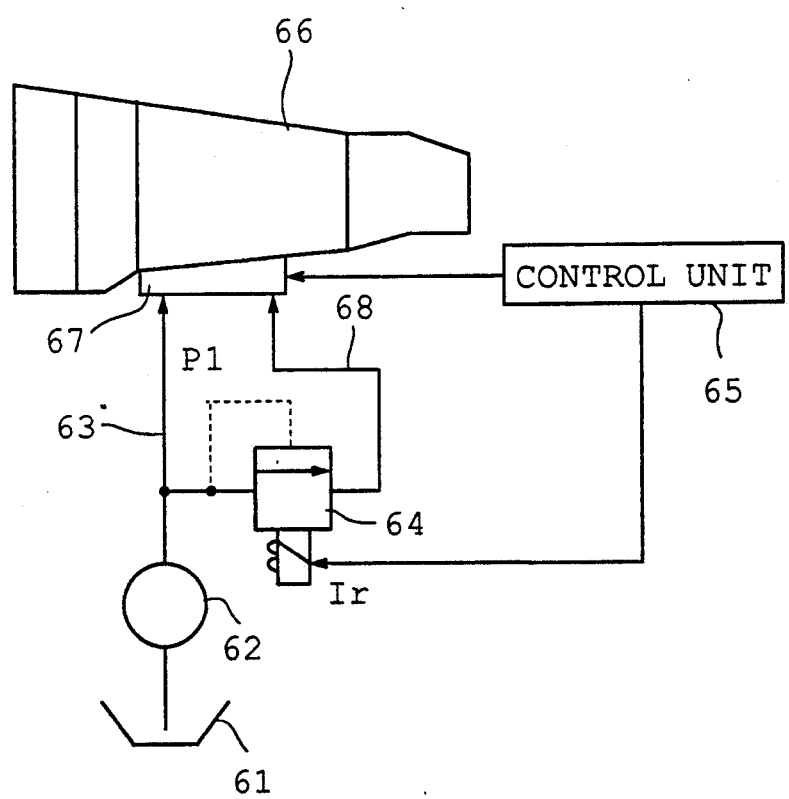
FIG. 8 is a schematic diagram showing a hydraulic circuit of a further embodiment.

FIG. 8 shows a further embodiment. An automatic transmission 66 including a torque converter, a selector device and a gearbox has a control valve unit 67. A hydraulic circuit is provided with a line pressure control valve 64 with a proportional solenoid operated relief valve. Oil in an oil reservoir 61 is supplied to the line pressure control valve 64 through a passage 63 by an oil pump 62 for producing a predetermined line pressure Pl. The passage 63 is communicated with the control valve unit 67. The control valve 64 is communicated with the control valve unit 67 through a lubricating passage 68. A control unit 65 is connected to the valve 64 and the control valve unit 67. The control unit 65 produces a solenoid current Ir which is applied to a solenoid of the relief valve so that the line pressure Pl is controlled by the solenoid current Ir. The control valve unit 67 is applied with the output signals from the control unit 65 in dependency on the vehicle driving and operating conditions for controlling respective oil pressure control devices of the torque converter, selector device and gearbox.

Figure 9:
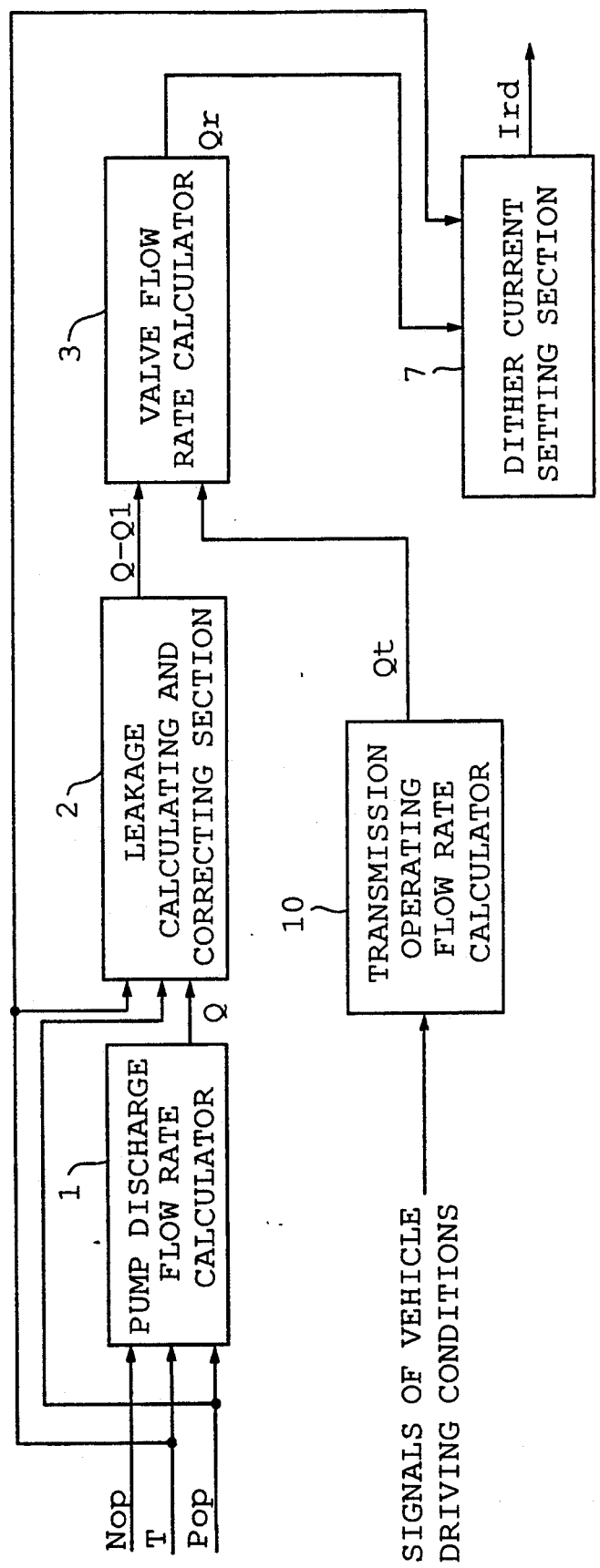
FIG. 9 is a block diagram showing a control system of FIG. 8.

Referring to FIG. 9, the control system has the pump discharge flow rate calculator 1, leakage calculating and correcting section 2, valve flow rate calculator 3, dither current setting section 7, and dither current generator 9, which have the same in functions and operation as those of the first embodiment shown in FIG. 2. The control system is further provided with a transmission operating flow rate calculator 10 which is applied with signals representing operations of the devices in the automatic transmission 66 such as a shift change device, selector device, and torque converter, and vehicle driving conditions. The flow rate calculator 10 calculates a transmission operating flow rate Qt based on data of test and measured values of the respective devices in accordance with the signals for operating actuators and control devices in the transmission. The flow rate Qt is applied to the valve flow rate calculator 3 wherein the flow rate Qr is calculated by subtracting the flow rate Qt from the flow rate $Q-Q1$. The flow rate Qr is applied to the dither current setting section 7 in which a dither current Ird is set.

In accordance with the present invention, the dither current added to the solenoid current of the proportional solenoid operated valve is adjusted by correcting the frequency and/or the amplitude thereof in accordance with the valve passing flow rate. Thus, the dither current properly reduces the hysteresis of the control pressure so that a sufficient control gain and a constant static characteristic are obtained between the solenoid current and the control pressure.

Since the slip of the belt and excessive oil to the hydraulic cylinder are eliminated, malfunctioning of the transmission is prevented.

In the automatic transmission, the dither current is corrected in accordance with the flow rate of transmission operating oil. Thus, the same effect can be obtained as the CVT.

In the system having the variable displacement pump, the valve passing flow rate can be accurately calculated in response to the operation of the directional control valve.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling a solenoid operated control valve in an automatic transmission to transmit power of an internal combustion engine to driving wheels of a motor vehicle, the system having a hydraulic system including an oil pump for supplying oil to the transmission through the solenoid operated control valve, a solenoid for operating the solenoid operated control valve, and a control unit for controlling a solenoid current fed to the solenoid, an improvement of the system which comprises:
   a calculator for calculating a flow rate of oil through the solenoid operated control valve and for producing a flow rate signal;
   setting means for setting at least one of frequency and amplitude of a dither current in accordance with said flow rate signal and for producing a dither current, the setting being accomplished by reduction of dither frequency upon an increase in the oil flow rate; and
   means for adding the dither current to the solenoid current.

2. The system according to claim 1, wherein
   the calculator derives the flow rate based on a discharge flow rate of the oil pump, temperature of the oil, and a transmission ratio of the transmission.

3. The system according to claim 1, further comprising means for sensing temperature of the oil;
   wherein the automatic transmission is a continuously variable transmission having: a drive pulley including a hydraulically shiftable disc and a first hydraulic cylinder for shifting said disc, a driven pulley including a hydraulically shiftable disc, a second hydraulic cylinder for operating said disc of said driven pulley, and a belt engaged with said pulleys; and
   wherein said setting means is operative to increase a dither frequency upon an increase in the oil temperature.

4. A hydraulic control system for a continuously variable belt-drive automatic transmission, comprising
   a hydraulic control circuit including an oil pump and a solenoid operated control valve having a proportional solenoid for controlling a secondary pressure,
   calculator means for calculating a flow rate of oil through the control valve in dependency on a discharge flow rate of the oil pump, a temperature of oil, a leakage of the oil from the circuit and a transmission ratio changing speed, and
   dither current setting means responsive to the calculated flow rate for setting a dither current for the solenoid by adjusting at least one of frequency and amplitude of the dither current; and wherein the setting means is operative to increase a frequency and decrease an amplitude of the dither current upon an increase in temperature of the oil.

5. The system according to claim 4, wherein
   the oil pump is a variable displacement pump having a plurality of outlet ports, at least one of the outlet ports is selectively communicated with an input of the pump through a directional control valve, whereby the discharge flow rate of the pump is adjustable.

6. The system according to claim 5, wherein
   the valve flow rate calculator derives the valve flow rate responsive to an operation of an directional control valve.

7. A system for controlling a proportional control valve in a hydraulic system including an oil pump for supplying oil to a hydraulic device through the control valve, the system having a control unit for controlling an operating signal fed to the control valve in order to control the control valve, an improvement of the system which comprises:
   a calculator for deriving a flow rate of the oil through the solenoid operated control valve and for producing a flow rate signal;
   setting means responsive to said flow rate signal for setting at least one of frequency and amplitude of a dither signal in accordance with said flow rate signal and for producing a dither signal; and
   means responsive to said dither signal for adding the dither signal to the operating signal to reduce hysteresis characteristics of said valve so as to accurately obtain a sufficient control gain and constant static characteristics of said valve; and
wherein said setting means is operative to increase a dither frequency upon an increase in the oil temperature, the setting being accomplished by reduction of dither frequency upon an increase in the oil flow rate and by an increasing in the amplitude of the dither current upon an increase in flow rate.

8. A control system of a solenoid operated control valve in a continuously variable transmission for transmitting power of an engine to a driving wheel of a motor vehicle having a drive pulley with a first hydraulically shiftable disk and a first hydraulic cylinder for operating said first disk, a driven pulley with a second hydraulically shiftable disk and a second hydraulic cylinder for operating said second disk, a hydraulic pump for supplying a hydraulic fluid to said transmission through said control valve, a solenoid connected to said valve for controlling a flow rate of said fluid, a relief valve connected to said second hydraulic cylinder for controlling a fluid pressure in said second hydraulic cylinder, and a control unit for operating said solenoid with an electric current, an improvement of the system which comprises:
   pump delivery amount calculating means provided in said control unit for calculating a delivery amount of said fluid from said pump and for producing an amount signal;
   correcting means responsive to said amount signal for calculating a correction amount from a leak and a delivery pressure of said fluid from said pump and for generating a correction signal;
   shifting speed calculating means for calculating an actual shifting speed by detecting speed of said drive and driven pulleys and for generating a shifting speed signal;

secondary flow rate calculating means response to said shifting speed signal for calculating a secondary flow rate of said fluid in said second hydraulic cylinder and for outputting a secondary flow rate signal;

primary flow rate calculating means responsive to said shifting speed signal for calculating a primary flow rate of said fluid in said first hydraulic cylinder and for outputting a primary flow rate signal;

secondary valve flow rate calculating means responsive to said correction signal and said primary and second flow rate signals for computing a relief amount of said fluid through said relief valve and for generating a relief signal;

secondary valve dither setting means responsive to said relief signal for calculating a secondary dither frequency of said current with a decreasing function of said relief amount in dependency on temperature of said fluid; and primary valve dither setting means responsive to said primary flow rate signal for computing a primary dither frequency of said current with a decreasing function of said primary flow rate in dependency on temperature of said fluid so as to apply an optimum dither effect and to precisely decrease hysteresis at any flow rates.

9. A control system of a solenoid operated control valve in a continuously variable transmission for transmitting power of an engine to a driving wheel of a motor vehicle having a drive pulley with a first hydraulically shiftable disk and a first hydraulic cylinder for operating said first disk, a driven pulley with a second hydraulically shiftable disk and a second hydraulic cylinder for operating said second disk, a hydraulic pump for supplying a hydraulic fluid to said transmission through said control valve, a solenoid connected to said valve for controlling a flow rate of said fluid, a relief valve connected to said second hydraulic cylinder for controlling a fluid pressure in said second hydraulic cylinder, and a control unit for operating said solenoid with an electric current, an improvement of the system which comprises:

pump delivery amount calculating means provided in said control unit for calculating a delivery amount of said fluid from said pump and for producing an amount signal;

correcting means responsive to said amount signal for calculating a correction amount from a leak and a delivery pressure of said fluid from said pump and for generating a correction signal;

shifting speed calculating means for calculating an actual shifting speed by detecting speed of said drive and driven pulleys and for generating a shifting speed signal;

secondary flow rate calculating means responsive to said shifting speed signal for calculating a secondary flow rate of said fluid in said second hydraulic cylinder and for outputting a secondary flow rate signal;

primary flow rate calculating means responsive to said shifting speed signal for calculating a primary flow rate of said fluid in said first hydraulic cylinder and for outputting a primary flow rate signal;

secondary valve flow rate calculating means responsive to said correction signal and said primary and secondary flow rate signals for computing a relieve amount of said fluid through said relief valve and for generating a relief signal;

secondary valve dither setting means responsive to said relief signal for calculating a secondary dither amplitude of said current with an increasing function of said relief amount in dependency on temperature of said fluid; and primary valve dither setting means responsive to said primary flow rate signal for computing a primary dither amplitude of said current with an increasing function of said primary flow rate in dependency on temperature of said fluid so as to apply an optimum dither effect and to precisely decrease hysteresis at any flow rates.

10. A control system of a solenoid operated control valve in a continuously variable transmission for transmitting power of an engine to a driving wheel of a motor vehicle having a drive pulley with a first hydraulically shiftable disk and a first hydraulic cylinder for operating said first disk, a driven pulley with a second hydraulically shiftable disk and a second hydraulic cylinder for operating said second disk, a hydraulic pump for supplying a hydraulic fluid to said transmission through said control valve, a solenoid connected to said valve for controlling a flow rate of said fluid, a relief valve connected to said second hydraulic cylinder for controlling a fluid pressure in said second hydraulic cylinder, and a control unit for operating said solenoid with an electric current, an improvement of the system which comprises:

pump delivery amount calculating means provided in said control unit for calculating a delivery amount of said fluid from said pump and for producing an amount signal;

correcting means responsive to said amount signal for calculating a correction amount from a leak and a delivery pressure of said fluid from said pump and for generating a correction signal;

shifting speed calculating means for calculating an actual shifting speed by detecting speed of said drive and driven pulleys and for generating a shifting speed signal;

secondary flow rate calculating means responsive to said shifting speed signal for calculating a secondary flow rate of said fluid in said second hydraulic cylinder and for outputting a secondary flow rate signal;

primary flow rate calculating means responsive to said shifting speed signal for calculating a primary flow rate of said fluid to said first hydraulic cylinder and for outputting a primary flow rate signal, secondary valve flow rate calculating means responsive to said correction signal and said primary and secondary flow rate signals for computing a relief amount of said fluid through said relief valve and for generating a relief signal;

second valve dither setting means responsive to said relief signal for setting a dither current derived from multiplying a secondary dither frequency of said current with a decreasing function of said relief amount by a secondary dither amplitude of said current with an increasing function of said relief amount in dependency on temperature of said fluid; and primary valve dither setting means responsive to said primary flow rate signal for setting a dither current derived from multiplying a primary dither frequency of said current with a decreasing function of said relief amount by a primary dither amplitude of said current with an increasing function of said primary flow rate in dependency on temperature of said fluid so a to apply an optimum dither effect and to precisely decrease hysteresis at any flow rates.

* * * * *